Patented Jan. 20, 1942

2,270,269

UNITED STATES PATENT OFFICE 2,270,269

METHOD OF PRECIPITATING NEOARSPHENAMINE

Walter G. Christiansen, Glen Ridge, N. J., and Alfred E. Jurist, Brooklyn, N. Y., assignors to E. R. Squibb & Sons, New York, N. Y., a corporation of New York No Drawing. Application October 4, 1938, Serial No. 233,246

2 Claims. (Cl. 260—444)

This invention relates to, and has for its object the provision of, a method of precipitating neoarsphenamine in a condition adapted for drying.

Neoarsphenamine, a therapeutic agent used in the treatment of syphilis, is a complex, sensitive, potent preparation that, even when in good condition at the time of use, and a fortiori if defective, may cause reactions and other undesired effects, and should therefore be of satisfactory quality when made and should not deteriorate. Among the various factors tending to bring about, or to facilitate, change, the primary one is the presence of moisture; so that if the neoarsphenamine has a relatively high moisture content due either to incomplete drying or to exposure to a moist atmosphere, it is very sensitive and undergoes deteriorative changes on aging. In this manner, an insufficiently dry sample, even though initially suitable for use, may deteriorate and become unfit for use. Dryness, in other words, is essential for high stability; but hitherto neoarsphenamine having a moisture content as low as about 3% (which, as will appear hereinafter, is a very low limit) has not been available.

The stable neoarsphenamine of this invention is substantially pure (i. e., meets the strict requirements of the National Institute of Health) and has a total-volatile content—which is largely or wholly moisture—of less than about 3%, preferably less than about 2% or even 1%, as determined by measuring the loss in weight of a sample that has been exposed to a temperature of 56° C. under a vacuum of 29–30 inches for seven hours.

In the preparation of chemicals, greater dryness may ordinarily be attained by increasing the severity of the conditions, e. g., in refractory cases, using elevated temperatures and a high vacuum; but incompletely dried neoarsphenamine, being adversely affected by heat, cannot be dried at elevated temperatures; hence it is not possible to go beyond high vacuum at or slightly above room temperature, in the presence of a dehydrating agent. Moreover, neoarsphenamine is hygroscopic, tending to absorb moisture from any contacting medium, gaseous or liquid, and to hold it tenaciously. Circumstances, then, do not favor reduction of the moisture content of neoarsphenamine to a low point.

The affinity of neoarsphenamine for moisture is so great that exposure of the product to air having a humidity of more than 20–30%, or contact with liquids containing water, results in rapid absorption of moisture, which is not removable to any significant extent by washing with a liquid, such as anhydrous alcohol, having a strong affinity for water. Neoarsphenamine, as commonly produced by precipitation with alcohol in an aqueous reaction mixture and isolation therefrom, carries with it an appreciable quantity of moisture that accordingly cannot be removed even by repeated washing with anhydrous alcohol, and must be eliminated by a subsequent drying step. In some instances heretofore it has been impossible to reduce the moisture content below 5–7% even by vacuum-drying for weeks; it has been found necessary to precipitate the neoarsphenamine in such physical form that the moisture can be removed therefrom under the permissible drying conditions within a reasonably short time.

When a material is precipitated from an aqueous solution thereof by mixing the solution with a water-miscible solvent in which the material is insoluble, the physical character of the precipitate is controlled by the following factors: the composition of the aqueous solution, the nature of the precipitating liquid, the manner in which the two liquids are mixed, and the conditions under which mixing is done. In the preparation of neoarsphenamine the precipitating liquid necessarily used is alcohol. In the practice of this invention, the other above-noted controlling factors are adjusted to produce a precipitate which can be dried easily and quickly to a low moisture content and thereby brought to a condition of maximum stability. Such a precipitate is obtained when a concentrated aqueous solution of neoarsphenamine is neutralized, mixed with sodium chloride, and introduced gradually into a volume of cold ethyl alcohol while agitating.

The following example is illustrative of the invention:

A concentrated aqueous solution of neoarsphenamine (e. g. about 33 g./100 cc.) is produced from arsphenamine, or its base 3,3'-diamino-4,4'-dihydroxy arsenobenzene, by means of sodium formaldehyde sulfoxylate, using one of the processes described in the scientific literature. The excess alkali in the reaction mixture is carefully neutralized with a suitable acid until the solution is no longer alkaline to phenolphthalein, and an amount of sodium chloride equivalent to about ⅓ gram per gram of arsenic is added. Then a volume of ethyl alcohol which corresponds to about three times the reaction mixture and which has previously been cooled to below about 5° C., is placed in a suitable container and agitated, and meanwhile the reaction mixture is introduced thereinto in a stream. When about one-third of the reaction mixture has been added, more cold ethyl alcohol is added in the form of a stream of such a size that the ratio of the reaction mixture to alcohol being added is about 1:10. This is continued until all of the reaction mixture is in the precipitation vessel; and the precipitate is separated, washed with cold ethyl alcohol, and dried by subjecting it to a vacuum of not more than about 40 mm. absolute pressure at a temperature of about 30° C., in the presence of phosphorus pentoxide. The substantially pure neoarsphenamine thus produced has a total-volatile content of about 1% and is of high stability.

The invention may be variously otherwise embodied within the scope of the appended claims.

We claim:

1. The method of precipitating neoarsphenamine in a condition adapted for drying, which comprises neutralizing the excess alkali in a concentrated aqueous solution of neoarsphenamine until the solution is no longer alkaline to phenolphthalein, adding an amount of sodium chloride equivalent to about ⅓ g. per g. of arsenic and introducing the resultant solution gradually and while agitating into ethyl alcohol which has previously been cooled to below about 5° C.

2. The method of precipitating neoarsphenamine in a condition adapted for drying, which comprises neutralizing the excess alkali in a concentrated aqueous solution of neoarsphenamine until the solution is no longer alkaline to phenolphthalein, adding sodium chloride, and introducing the resultant solution gradually into cold ethyl alcohol while agitating.

WALTER G. CHRISTIANSEN.
ALFRED E. JURIST.